United States Patent Office 2,942,974 Patented June 28, 1960

2,942,974

PHOTOSENSITIVE RESISTS AND PHOTO-MECHANICAL PROCESS

George Schwarz, Glen Head, N.Y., assignor to Powers Chemco, Inc., Glen Cove, N.Y., a corporation of New York No Drawing. Filed May 10, 1956, Ser. No. 583,933

12 Claims. (Cl. 96—33)

The present invention relates to a novel and improved photomechanical process as well as to a novel and improved photosensitive resist particularly adapted for use in the "deep etch" process.

This application is a continuation-in-part of my application Serial No. 412,087, filed February 23, 1954, now abandoned.

Objects and advantages of the invention will be set forth in part hereinafter and in part will be obvious herefrom, or may be learned by practice with the invention, the same being realized and attained by means of the steps, process, compositions, instrumentalities and combinations pointed out in the appended claims.

The invention consists in the novel steps, process, compositions, parts, constructions, arrangements, combinations and improvements herein shown and described.

The present invention has for an object the provision of a novel and improved photosensitive resist with which the development or removal of the unexposed areas of the resist may be more easily and positively controlled than has heretofore been possible. A further object is the provision of an improved resist which can be rendered soluble after development and exposure. Still another object is the provision of a novel and improved photomechanical process involving the use of such a photosensitive resist, and especially an improved process of forming an intagliated photoplanographic printing surface in which the ink receptive areas are slightly depressed below the surface of the planographic plate. The photosensitive resist of the present invention is especially useful in many of the processes where it is desired to prepare the plates to be processed in advance, or where it is desired to keep the exposed plates for a period of time before they are developed.

Heretofore, a wide variety of photographic processes have been proposed and put into practice based upon the light-hardening of certain film-forming, organic colloids when exposed in the presence of various chromates, such as potassium bichromate or ammonium chromate. Among the various organic colloids which have been used are such materials as gelatin, fish glue, egg albumin, casein, soya bean protein, acacia gum, shellac and polyvinyl alcohol, as well as others. All of these colloids have specifically different properties and are accordingly used for a wide variety of uses to which they are best suited. Thus, in photoplanography gum arabic is usually used, while glue or shellac is usually used for photoengraving. In most instances, the organic colloids have been sensitized with some salt yielding the chromate ion.

In many of the prior processes, the organic colloid, hardened by the action of light upon its contained chromate, remains fairly soluble in water and even a slight deviation in the temperature of the water often results in improper development of the hardened colloid or resist. In photoplanographic processes, gum arabic has been the preferred colloidal material, and its ready solubility in warm water has been suppressed by the use of solutions of calcium salts prior to the removal of the exposed image.

Precoating of sensitized plates cannot be carried out under commercial conditions as the life of such plates is only a few days, and the sensitivity of such plates varies with their age, due to the progressive action of the chromate on the colloid, such as gelatin or glue, even in the absence of light. Also, an exposed plate of chromated gelatin or glue is subject to a progressive hardening of the gelatin, so that exposed plates must normally be developed promptly after exposure, if consistent results are to be obtained in the work.

According to the present invention, the light sensitive material is comprised of a "solution," or water-dispersion of dextran, otherwise known as macrose, sensitized with a photosensitive hardening composition which is preferably a salt yielding the chromate ion, such as a soluble chromate or bichromate.

For the purpose of the present application, dextran may be defined as an organic colloidal polysaccharide material which can be suspended or "dissolved" in water to yield a colloidal solution. Dextran is produced commercially by a fermentation process and yielding compounds of relatively large molecular weight, varying from one or a few thousand to several million, the higher molecular weight compounds giving water solutions of higher viscosity and being used generally in lower concentrations than the lower molecular weight compounds. Dextran is generally considered as being a polysaccharide or a polymeric sugar, related to sucrose, whence it is also called macrose. By hydrolysis, the higher molecular weight dextrans yield those of lower molecular weight, and for the present purposes, dextrans which are hydrolyzed and which have molecular weights varying from about 10,000 to about 500,000 are generally used, and I prefer those which have molecular weights varying from about 100,000 to 300,000. Among the most preferable commercially available dextrans which I have found is the hydrolyzed grade "HH" sold by R. K. Laros Co., Bethlehem, Pennsylvania, but the invention is not so limited, and various hydrolyzed and unhydrolyzed grades of dextran are usable.

The term "dextran" as used herein refers to the polymers which are produced by the action of micro organisms, such as leuconostoc mesenteroides or leuconostoc dextranicum on sucrose containing nutrient solutions such as defined or raw sugar, molasses, etc. and includes the degradation products of such polymers, produced by hydrolysis, having molecular weights varying from about 100,000 to about 300,000.

The following illustrative example shows the manner in which the new composition of my invention may be applied to the production of intagliated photoplanographic plates, sometimes referred to in the trade as "deep etch process" plates, and the process will be described with special reference to the conventional process of producing such plates.

The photosensitive resist is preferably formed from a water solution containing about 3% to 20%, and preferably 12% dextran and about 0.5% to 3% ammonium bichromate (or sodium, potassium or organic amine chromate or bichromate), preferably about one-sixth the weight of the bichromate adjusted by the addition of chromic acid or a bichromate or ammonia to have a pH from about 4 to about 9. It is generally desirable to keep the pH above 3.5 and most preferably between pH 4 and pH 5 although higher values of pH may be used with some loss in sensitivity. Solutions with a pH from 4 to 5 have a long life in spite of their relatively low pH, and plates coated with such solutions and dried remain in good condition for use even over a period of several weeks if protected from actinic light, while plates coated with a conventional sensitizing solution must ordinarily be used and processed within 24 hours in spite of the strongly alkaline nature of the conventional sensitizer.

The details of the process of preparing and processing a planographic plate in accordance with the deep etch process need not be set forth as these details are fully explained and set forth in Circular No. 504, "Offset Platemaking, Deep Etch (Gum) Process," published by the Lithographic Technical Foundation, Inc., New York, N.Y.

The principal steps of the conventional process and the most preferable changes advantageously effected with the use of the sensitizers of the present invention are illustratively set forth in the following columns:

| Conventional | New Process |
|---|---|
| Counter-etch clean aluminum plate | Same. |
| Coat with sensitizer | Same. |
| Dry | Same. |
| Expose | Same. |
| Develop in calcium chloride solution for approximately five minutes. | Develop one minute in water, or salt solution. |
| Etch | Etch. |
| Wash with large amounts of absolute alcohol. | Wash with water. |
| Dry | Same. |
| Lacquer and ink | Same. |
| Release stencil in water and scrub hard with brush. | Use releasing agent described below and wipe lightly with cotton wool. |
| Desensitize | Same. |
| Gum, dry, moisten ink and print | Same. |

After the plate has been exposed to the suitable light image and developed in water, it is etched by any suitable etching liquid, such as a solution of calcium chloride and hydrochloric acid, in case the plate is zinc, or a solution of calcium chloride, ferric chloride and hydrochloric acid if the plate is of aluminum. The plate is then washed with water, dried, lacquered and rolled up with a layer of a greasy ink or other hydrophobic coating. The image layer or stencil of insolubilized dextran beneath the ink and lacquer coating is then released by immersing the plate in a dilute solution of a chromate-ion complexing agent which renders the dextran soluble and the plate is gently wiped with a moist wad of cotton wool to remove the dextran and overlying hydrophobic layer to give the desired grease-receptive images on the plate.

Thereafter the plate is desensitized by coating with a solution of phosphoric acid and gum arabic containing a small amount of ammonium bichromate, and when dried, moistened and inked it is ready for printing.

The releasing agent referred to above for use in the process of the present invention may be a 10% water solution of the disodium salt of ethylenediamide-tetra-acetic acid, although many other chromic-ion-complexing agents, or alkaline solutions may be used to render the exposed and hardened dextran soluble in water. Among these other agents are water solutions of mild alkalis, such as ammonia, ammonium carbonate, sodium carbonate, and various chromic-ion-complexing agents, such as citric acid, gluconic acid, tartaric acid and hydroxyacetic acid, as well as the water soluble salts of these acids, the sodium salts of the polyphosphates, such as sodium hexametaphate, sodium tripolyphosphate, and also organic alkaline compounds, such as triethanolamine and morpholine. Such compounds may surprisingly be used in the process of the present invention to render water-soluble an organic colloidal film which has been rendered insoluble by a light-sensitive hardening compound, such as a chromate or bichromate.

The chromate or bichromate which has been exposed to light and remains in the insoluble dextran is referred to as the chromate residue, and it and the dextran may be rendered soluble by a solubilizing agent selected from the group consisting of alkaline materials, such as those mentioned above and complexing agents, such as ethylene diamine tetraacetic acid and its soluble salts, such as disodium ethylene diamine tetraacetate. Other complexing agents suitable for use are the other amino acetic acids, diethylene triamine pentaacetic acids, and their derivatives.

The water development of the dextran image may take place using water or an aqueous solution of a salt, such as calcium chloride or potassium chloride, as is conventional. Alternatively, the separate development step may be omitted and the developing and etching may take place simultaneously as a combined step using a conventional etching solution such as calcium chloride-hydrochloric acid solution for zinc, or calcium chloride-ferric chloride-hydrochloric acid solution for aluminum. Such a combined developing and etching operation would not be feasible with a resist of gum arabic or any other colloid which has been used as photosensitive resist. Bichromated dextran appears to be unique in that after exposure, it retains good strength as a resist in the the presence of salt-free water and at the same time can be readily removed without damage to the plate.

Other polysaccharides, such as dextrine, are not good film-formers and could not be used in photolithography from the practical point of view. Arabinose and similar sugars do not harden sufficiently.

Gum arabic while suitable as a resist in the deep etch process requires the use of large volumes of absolute alcohol to remove the salts which are required in the aqueous developer, thus adding greatly to the cost of the operation. Attempts to eliminate the alcohol in the conventional process have proved to be commercially unsuccessful.

The advantages realized by the use of the photosensitive resist of the present invention in the deep-etch process, beyond those mentioned are the saving in time, the easier and more positive release obtained by the new material, the elimination of the large quantities of expensive absolute alcohol which are conventionally used, and the use of water in place of the calcium salt solution. Thus, the whose process is simplified, rendered more certain, and the cost of the operation, both in time and materials, is greatly reduced.

The sensitized resists of the present invention are superior to those of the prior art in general, due to the longer life both in solution, as an unexposed coating, and as an exposed coating, retaining substantially the same sensitivity over a long period of time. This is of especial importance in such work as step-and-repeat work as no compensation need be made in the exposure from the beginning to the end of the work. Additionally, work on a plate need not be completed on a particular day, and it is even possible to begin work on a step-and-repeat plate at the of a week, and to complete the work after the weekend.

The advantages realized by the use of the photosensitive resist of the present invention in the deep-edge process, beyond those mentioned are saving in time, the easier and more positive release obtained by the new material, the elimination of the large quantities of expensive absolute alcohol which are conventionally used, and the use of water in place of the calcium salt solution. Thus, the whole process is simplified, rendered more certain, and the cost of the operation, both in time and materials, is greatly reduced.

Conventional planographic plates for surface printing, in which the deep etch technique is not used may be prepared in the conventional manner, substituting a dextran-chromate photosensitive resist layer for the resist heretofore used.

The invention in its broader aspects is not limited to the specific steps, process, and compositions shown and described but departures may be made therefrom within the scope of the accompanying claims without departing from the principles of the invention and without sacrificing its chief advantages.

What is claimed is:

1. A photolithographic process which includes exposing to light a lithographic plate coated with a light sensitive layer of bacterial dextran and a water soluble chromate salt, removing unexposed portions of the dextran layer with an aqueous developer, etching the plate, coating the plate and remaining dextran layer with a greasy ink and removing the dextran by a water solution of a solubilizing agent selected from the group consisting of alkaline materials and acidic complexing agents for the chromate residue.

2. The process of claim 1 in which the dextran includes compounds of varying molecular weights from 100,000 to 300,000.

3. The process of claim 1 in which the chromate salt is from 10% to 40% of the weight of the dextran.

4. The process of claim 1 in which the solubilizing agent is an acidic complexing agent for the chromate residue.

5. The process of claim 1 in which the solubilizing agent is an alkaline material.

6. A photosensitive composition for photolithography comprising water, bacterial dextran and a water soluble chromate salt.

7. A photosensitive composition according to claim 6 in which the dextran includes compounds of varying molecular weights from 100,000 to 300,000.

8. A photosensitive composition according to claim 6 in which the dextran includes compounds of varying molecular weights from about 100,000 to 300,000 and the chromate salt is present from 10% to 40% of the weight of the dextran.

9. A process in which a layer of bacterial dextran and a chromate-ion yielding compound is rendered insoluble in water by exposure to light is dissolved by a water solution of a solubilizing agent selected from the group consisting of alkaline materials and acidic complexing agents for the chromate residue.

10. A process as claimed in claim 9 in which the solubilizing agent is a solution containing an acidic complexing agent for the chromate residue.

11. A process as claimed in claim 9 in which the solubilizing agent is a solution of an alkaline material.

12. A photoplanographic process which includes exposing to light a photoplanographic plate coated with a light sensitive layer of bacterial dextran and a water soluble chromate salt, and simultaneously removing unexposed portions of the dextran layer with a water soluble developer and etching the plate.

References Cited in the file of this patent

UNITED STATES PATENTS

| | | |
|---|---|---|
| 959,692 | Anthes | May 31, 1910 |
| 2,379,646 | Mueller | July 3, 1945 |
| 2,448,861 | Colt | Sept. 7, 1948 |
| 2,653,931 | Isbell | Sept. 29, 1953 |
| 2,671,779 | Gaver et al. | Mar. 9, 1954 |

FOREIGN PATENTS

| | | |
|---|---|---|
| 3,385 | British | Feb. 10, 1913 |

OTHER REFERENCES

Pigman et al.: Carbohydrate Chemistry (1948), Academic Press, Inc., New York, N.Y., page 513.